(12) United States Patent
Duval et al.

(10) Patent No.: US 12,474,019 B2
(45) Date of Patent: Nov. 18, 2025

(54) FLUID TRANSFER INSTALLATION

(71) Applicant: L'Air Liquide, Societe Anonyme pour l'Etude et l'Exploitation des Procedes Georges Claude, Paris (FR)

(72) Inventors: Stephane Duval, Sassenage (FR); Stephane Crevatin, Sassenage (FR); Peter de Maeyer, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 132 days.

(21) Appl. No.: 18/564,704

(22) PCT Filed: May 18, 2022

(86) PCT No.: PCT/EP2022/063375
§ 371 (c)(1),
(2) Date: Nov. 28, 2023

(87) PCT Pub. No.: WO2022/248295
PCT Pub. Date: Dec. 1, 2022

(65) Prior Publication Data
US 2024/0255104 A1   Aug. 1, 2024

(30) Foreign Application Priority Data
May 28, 2021   (FR) .................. FR 2105566

(51) Int. Cl.
*F17C 5/00*   (2006.01)
*B67D 9/02*   (2010.01)

(52) U.S. Cl.
CPC ............. *F17C 5/007* (2013.01); *B67D 9/02* (2013.01); *F17C 2205/0364* (2013.01);
(Continued)

(58) Field of Classification Search
CPC ....... Y10T 137/8807; F17C 2205/0364; F17C 2205/0367; F17C 2205/0352;
(Continued)

(56) References Cited

U.S. PATENT DOCUMENTS 2,818,891 A * 1/1958 Loeser ............... B67D 9/02
137/15.08
2,914,080 A * 11/1959 Silveston ............ B67D 9/02
414/139.6
(Continued)

FOREIGN PATENT DOCUMENTS

EP   2 433 901   3/2012
EP   2 955 427   12/2015

OTHER PUBLICATIONS

PCT Search Report and Written Opinion for PCT/EP2022/063375, mailed Sep. 12, 2022.
French Search Report for FR 2 105 566, mailed Jan. 26, 2022.

*Primary Examiner* — David Colon-Morales
(74) *Attorney, Agent, or Firm* — Justin K. Murray

(57) ABSTRACT

An installation transfers fluid between a source (e.g., a cryogenic fluid reserve) and a receiving unit (e.g., a boat reservoir). It includes a beam framework tower housing a fluid transfer circuit with a pipe extending from a lower connection to an upper connection. The tower is composed of at least two separable stacked modules, enabling different height configurations (two modules stacked or a single module). The transfer circuit within the tower has two sections, one in each module, connected by demountable connectors to adapt the circuit's height to the tower's configuration.

13 Claims, 7 Drawing Sheets

(52) U.S. Cl.
CPC .... *F17C 2205/0367* (2013.01); *F17C 2221/012* (2013.01); *F17C 2223/0161* (2013.01); *F17C 2270/0171* (2013.01); *Y10T 137/8807* (2015.04)

(58) Field of Classification Search
CPC ...... F17C 2223/0161; F17C 2225/0161; F17C 2270/0105; F17C 5/007; B67D 9/00; B67D 9/02
See application file for complete search history.

(56) References Cited

U.S. PATENT DOCUMENTS

| | | | | |
|---|---|---|---|---|
| 2,922,446 A * | 1/1960 | Sheiry | ................ | B67D 9/02 248/82 |
| 3,050,092 A * | 8/1962 | Palcanis | ................ | B63B 27/24 141/387 |
| 3,154,118 A * | 10/1964 | Silveston | ................ | B67D 9/02 192/93 R |
| 3,217,748 A * | 11/1965 | Harper | ................ | B67D 9/02 141/388 |
| 3,221,771 A * | 12/1965 | Dollinger | ................ | B66C 13/18 141/386 |
| 3,228,421 A * | 1/1966 | Sheiry | ................ | B67D 9/02 137/355.16 |
| 3,236,259 A * | 2/1966 | Ashton | ................ | B67D 9/02 137/615 |
| RE26,351 E * | 2/1968 | Sheiry | ................ | B67D 9/02 141/388 |
| 3,675,680 A * | 7/1972 | Frohlich | ................ | B67D 9/02 141/378 |
| 3,958,106 A * | 5/1976 | Bedford | ................ | B66C 13/40 212/326 |
| 4,090,538 A * | 5/1978 | Kotcharian | ................ | B63B 21/50 137/236.1 |
| 4,180,170 A * | 12/1979 | Meinken | ................ | E04G 21/0427 212/225 |
| 6,609,544 B1 * | 8/2003 | Williamson | ................ | B63B 27/24 114/230.1 |
| 6,637,479 B1 * | 10/2003 | Eide | ................ | B63B 27/24 114/230.1 |
| 7,610,934 B2 * | 11/2009 | Naciri | ................ | B63B 27/24 414/138.2 |
| 7,857,001 B2 * | 12/2010 | Kristensen | ................ | B63B 27/24 141/279 |
| 8,176,938 B2 * | 5/2012 | Queau | ................ | B67D 9/00 137/342 |
| 8,181,662 B2 * | 5/2012 | Pollack | ................ | B63B 27/34 137/15.08 |
| 8,308,517 B1 * | 11/2012 | Shivers, III | ................ | F25J 1/0278 114/230.17 |
| 8,308,518 B1 * | 11/2012 | Shivers, III | ................ | B63B 21/50 114/230.17 |
| 8,915,271 B2 * | 12/2014 | Liu | ................ | B67D 9/00 141/382 |
| 8,967,174 B1 * | 3/2015 | Perreault | ................ | B63B 27/34 414/138.2 |
| 9,004,102 B2 * | 4/2015 | Foo | ................ | B63B 27/34 294/81.1 |
| 9,004,103 B2 * | 4/2015 | Foo | ................ | B63B 27/34 294/81.1 |
| 9,643,690 B2 * | 5/2017 | Hessels | ................ | B65G 67/60 |
| 9,708,040 B2 * | 7/2017 | Le Devehat | ................ | B67D 9/02 |
| 10,247,338 B2 * | 4/2019 | Bryngelson | ................ | F17C 13/02 |
| 10,358,338 B2 * | 7/2019 | Liu | ................ | B65H 75/366 |
| 10,941,032 B2 * | 3/2021 | Waguespack | ................ | B63B 27/24 |
| 10,994,812 B2 * | 5/2021 | Colmard | ................ | B63C 1/06 |
| 2013/0153083 A1 | 6/2013 | Liu | | |
| 2015/0345703 A1 | 12/2015 | Allidieres | | |
| 2017/0283243 A1 | 10/2017 | Liu | | |

\* cited by examiner

[Fig. 1]
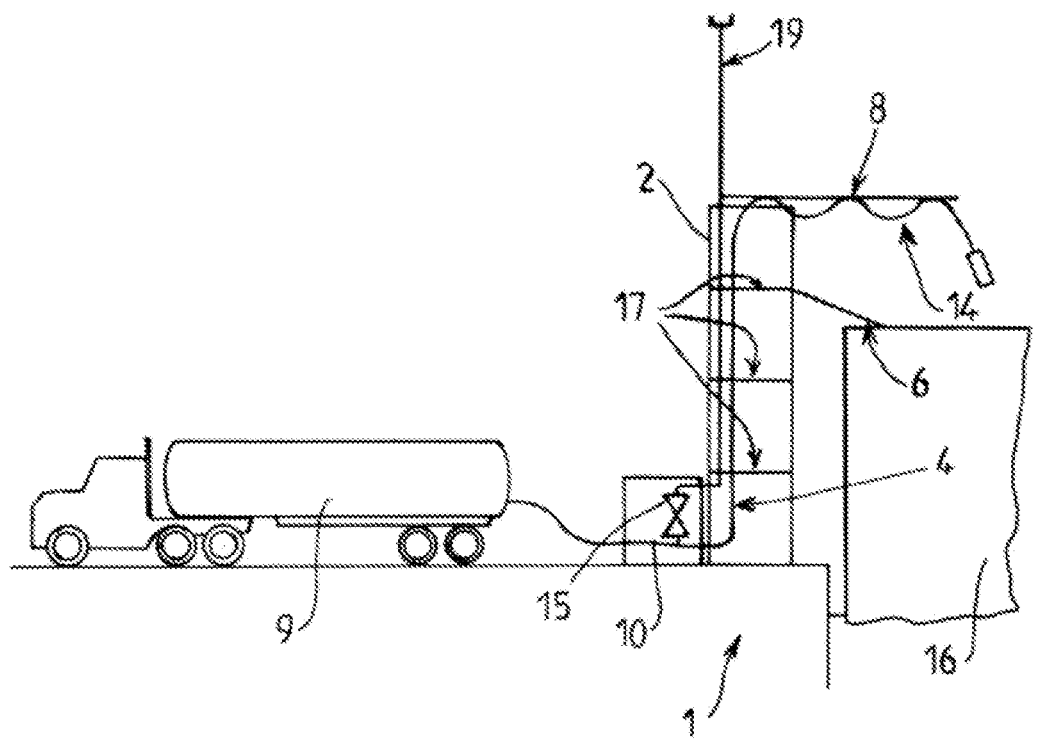

[Fig. 2]
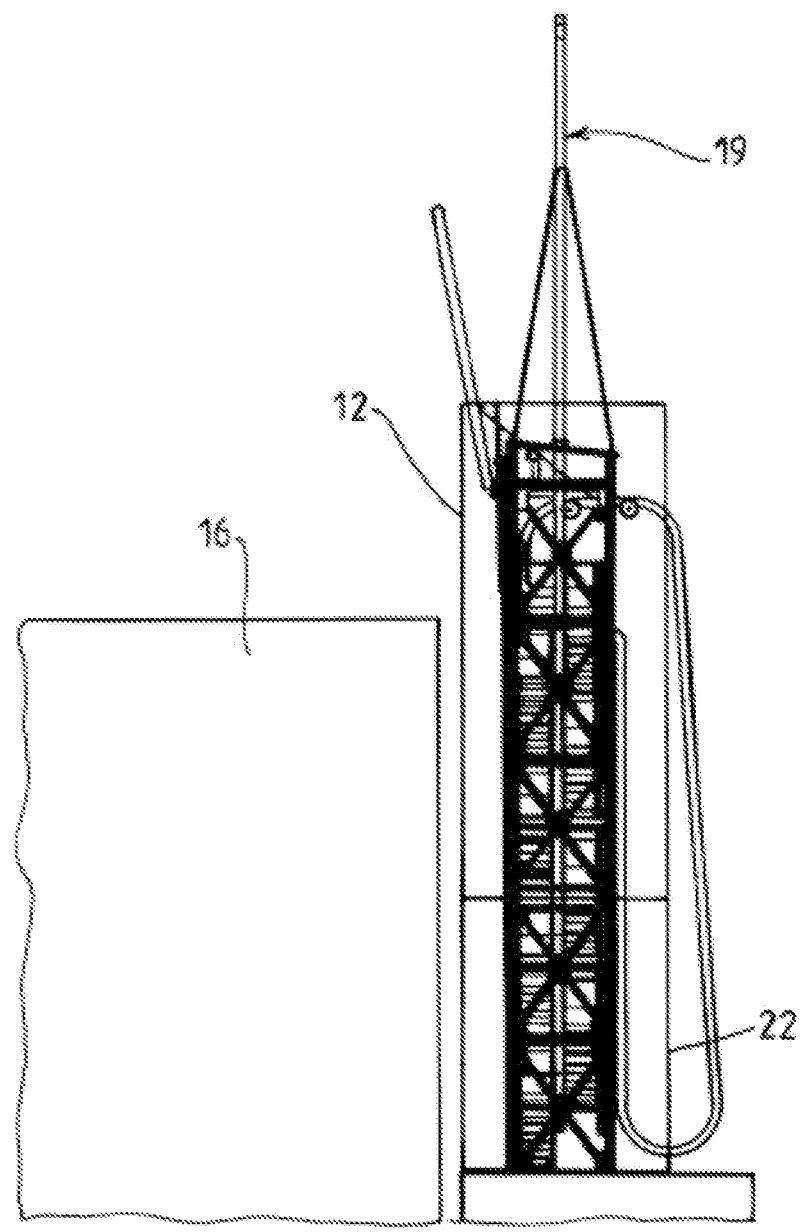

[Fig. 3]
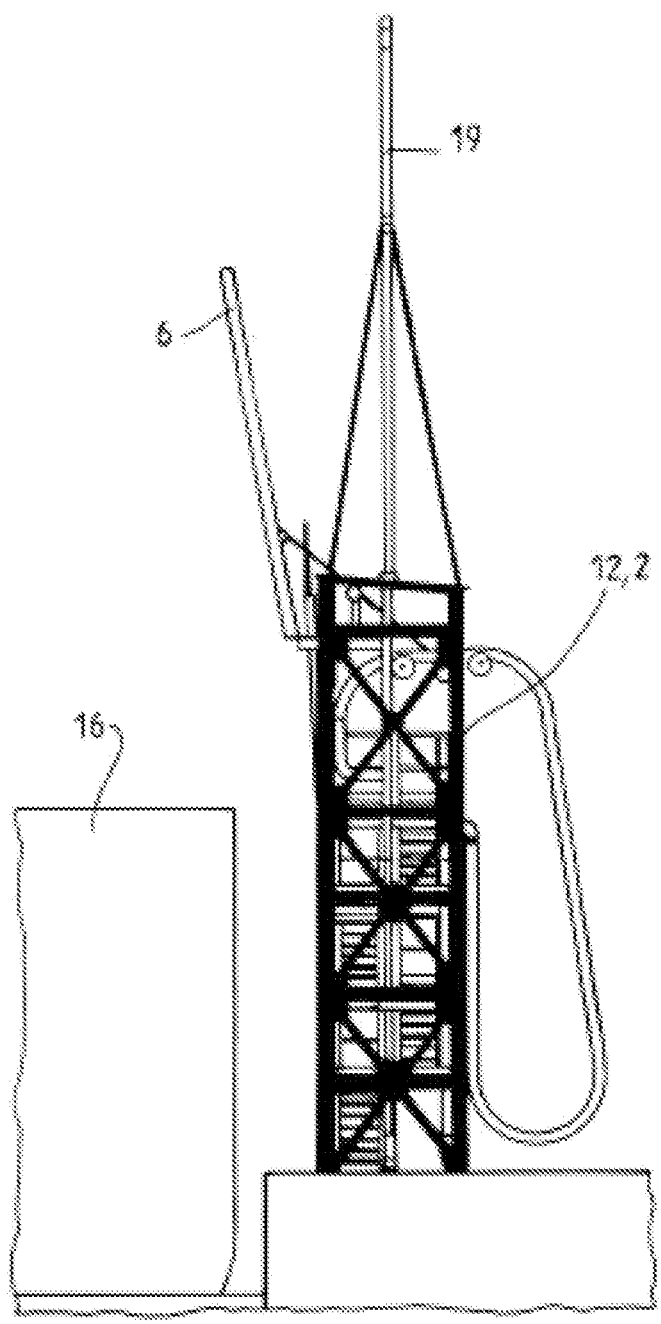

[Fig. 4]
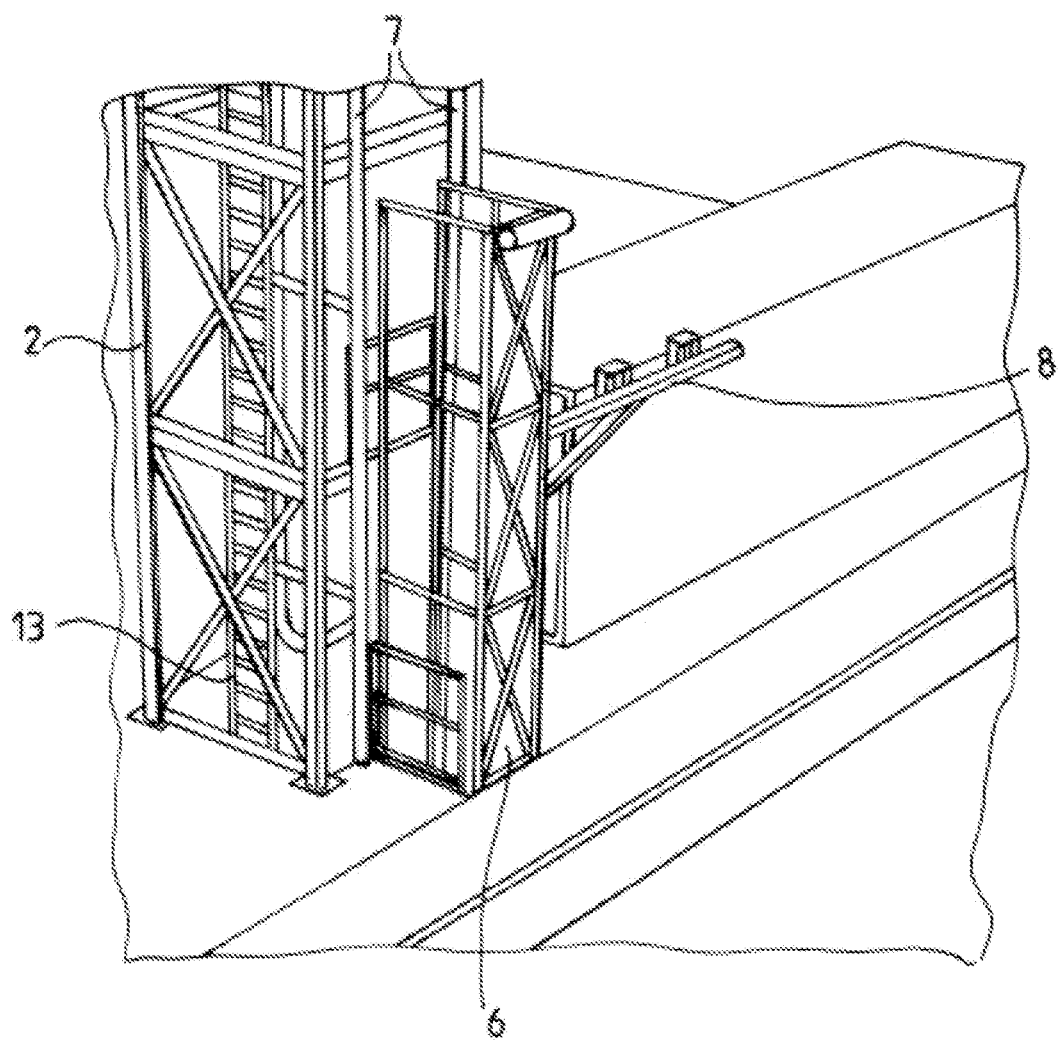

[Fig. 5]
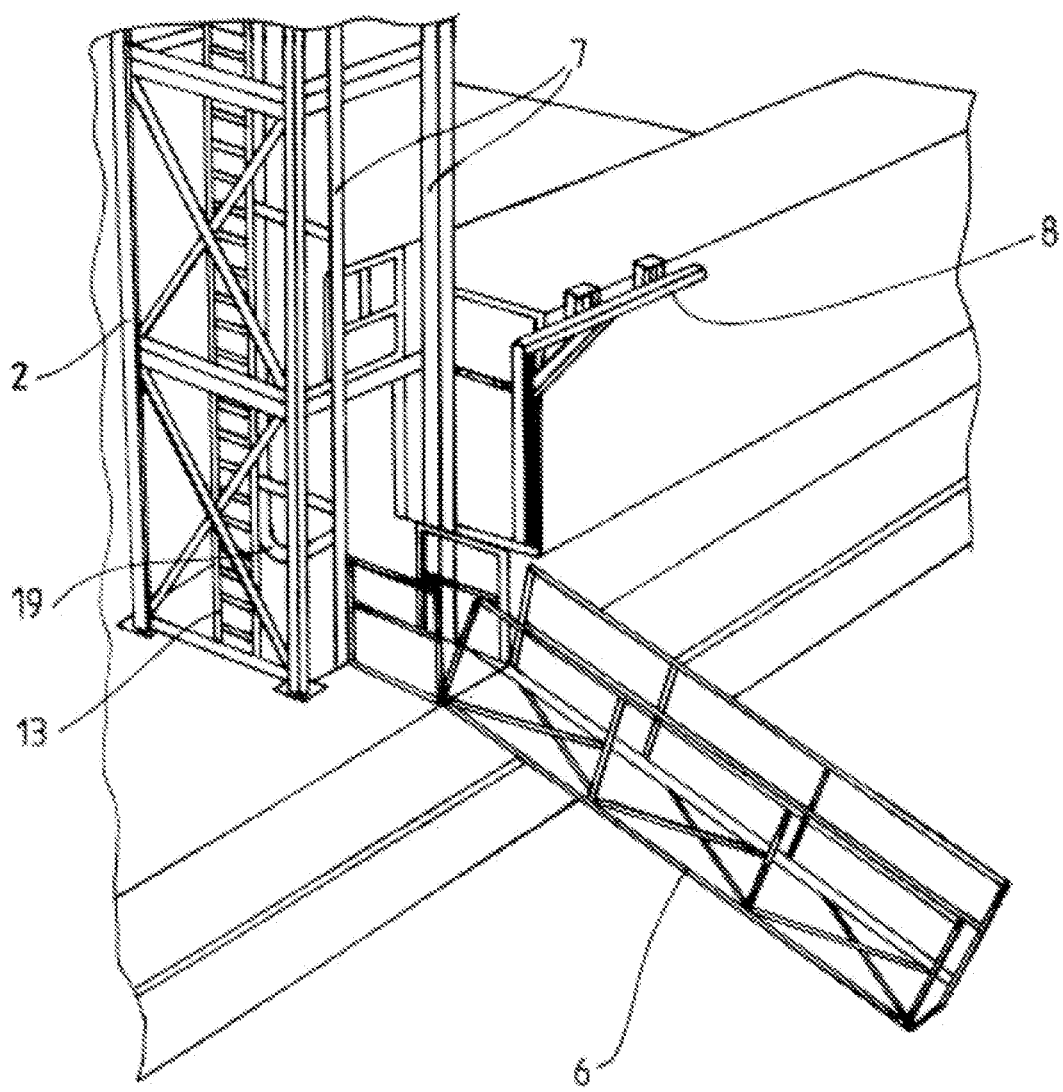

[Fig. 6]
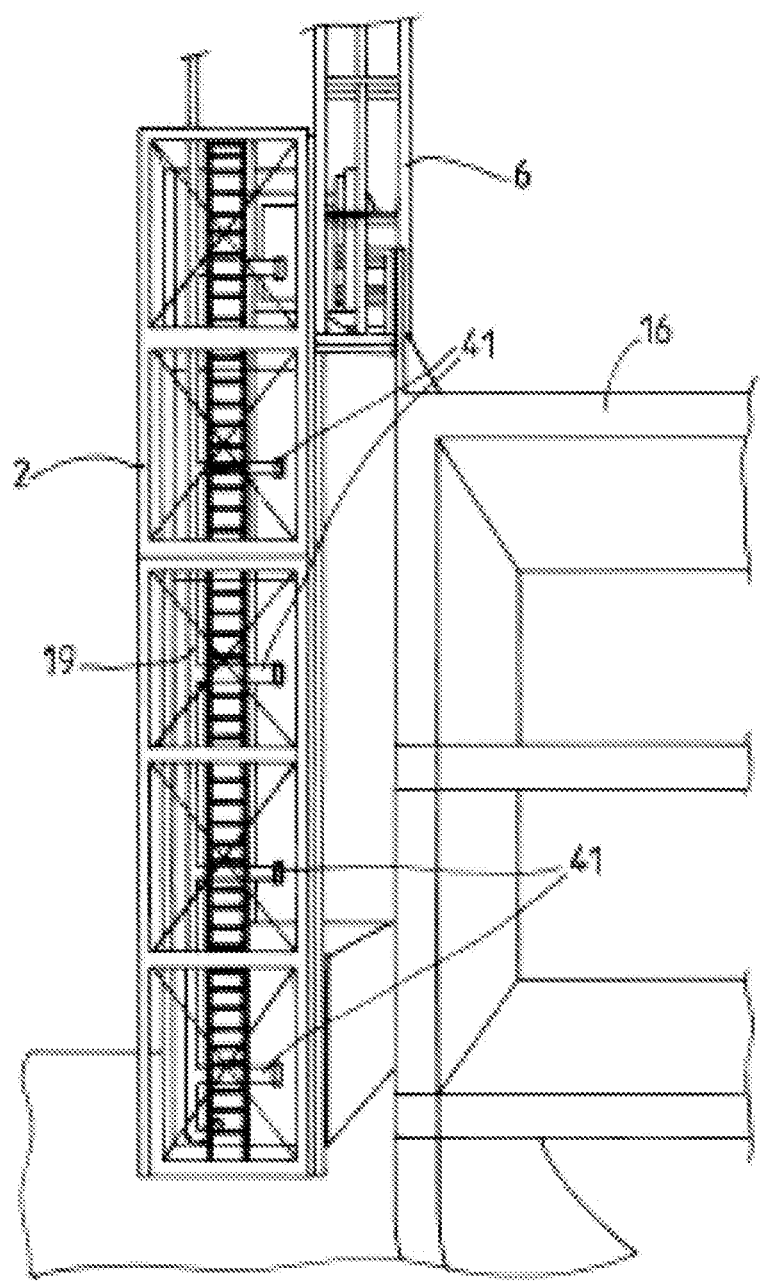

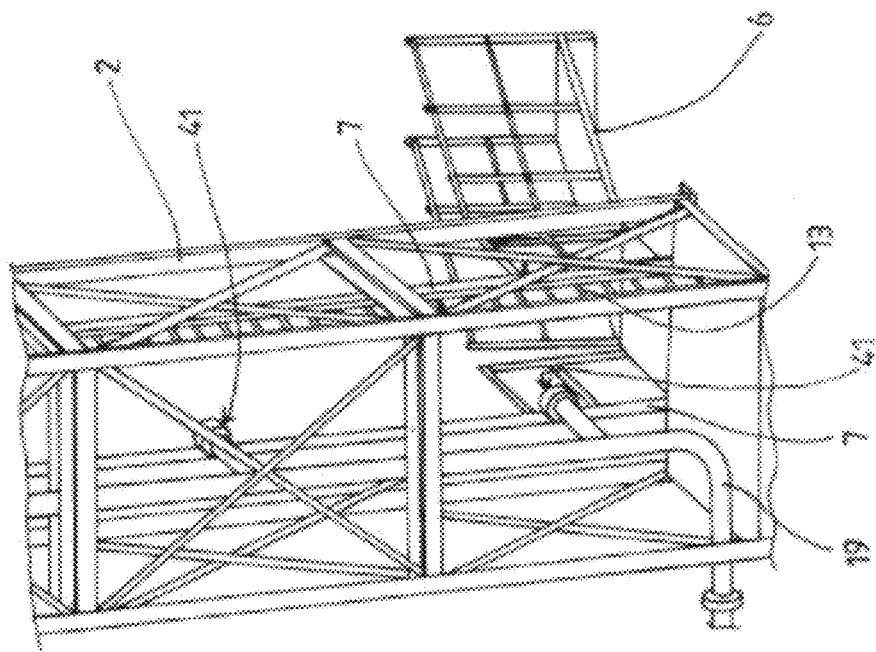
[Fig. 7]
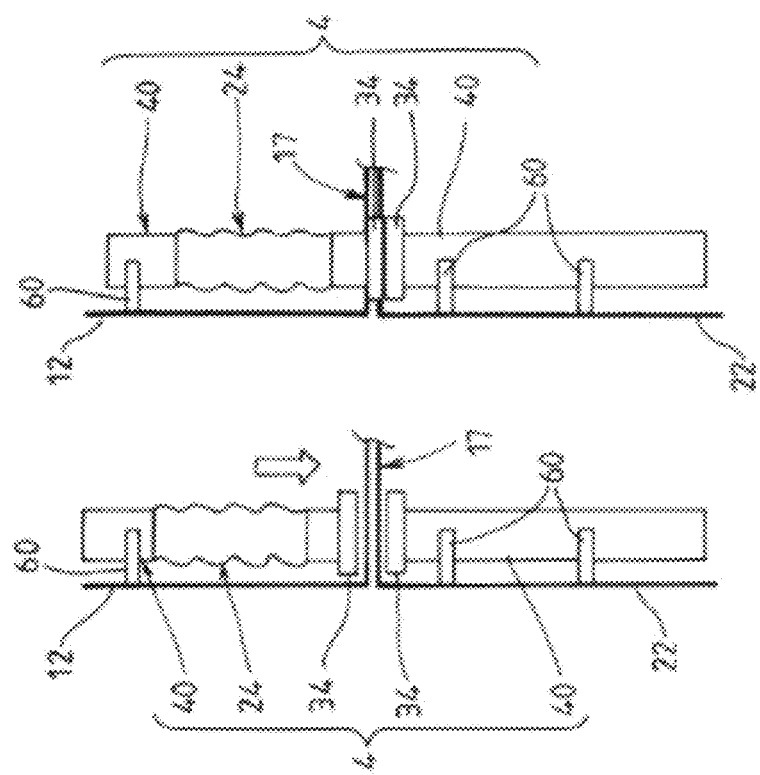
[Fig. 8]

FLUID TRANSFER INSTALLATION

CROSS REFERENCE TO RELATED APPLICATIONS

This application is a § 371 of International PCT Application PCT/EP2022/063375, filed May 18, 2022, which claims the benefit of FR2105566, filed May 28, 2021, both of which are herein incorporated by reference in their entireties.

FIELD OF THE INVENTION

The invention relates to an installation for transferring fluid between a fluid source (in particular a liquefied gas reserve) and a receiving unit (in particular a boat).

The invention relates in particular to an installation for transferring fluid between a fluid source, in particular a cryogenic fluid reserve and a receiving unit, in particular a boat reservoir, comprising a tower with a structure of the beam framework type, the tower comprising a fluid transfer circuit comprising a set of pipe(s) provided with a first pipe extending between a first lower end intended to be connected to a fluid source and a second upper end intended to be connected to a receiving unit, at least part of the transfer circuit situated between the first and second ends being housed within the volume delimited by the tower.

BACKGROUND OF THE INVENTION

The transport of liquefied hydrogen by boat generally requires a connection structure such as a tower to allow the transfer of fluid between the quay and the boat. Such a structure must make it possible to adapt to different configurations of boats (mainly height of access to the deck where the connection interface with the fluid source storage facility is situated).

Such a structure must be able to be conveyed to different ports and must satisfy numerous constraints and functionalities (transport, mounting/demounting, easy access to the operators, safety of the liquid and gas flows, etc.).

An aim of the present invention is to overcome all or some of the drawbacks of the prior art that are set out above.

SUMMARY OF THE INVENTION

To this end, the installation according to the invention, in other respects in accordance with the generic definition given thereof in the preamble above, may include a tower that is composed of at least two separable stacked modules allowing two different configurations of the tower respectively having different heights: a first configuration with the two stacked modules, and a second configuration with a single module, the transfer circuit situated within the volume delimited by the tower comprising two sections respectively situated in the two modules, the two sections being connected to one another via a system of demountable connectors configured to make it possible to adapt the height of the transfer circuit to the two configurations.

Furthermore, embodiments of the invention may comprise one or more of the following features:
  in a recumbent horizontal position, each of the modules has a width less than or equal to 2.5 m and a height less than or equal to 3.8 m,
  the lower module has, in the vertical position, a height less than or equal to the upper module,
  the transfer circuit situated within the volume delimited by the tower comprises pipes mounted on the structure of the tower via supports,
  at least some of the supports are mounted so as to be adjustable in position relative to the structure of the tower,
  at least some of the supports of the rigid pipes are mounted so as to be adjustable in a vertical position relative to the structure of the tower and/or transversely to the vertical direction of the tower,
  the transfer circuit situated within the volume delimited by the tower comprises at least one flexible pipe portion,
  the tower comprises a gangway mounted pivotably relative to the tower between a deployed position extending transversely to the tower and a retracted position extending along the tower, the gangway being mounted in a vertically slidable manner on the tower,
  the second end of the transfer circuit comprises a flexible hose, the tower comprising a support bracket for supporting said flexible hose,
  the bracket is mounted in a vertically slidable manner on the tower and/or is articulated on the tower about a vertical axis,
  the fluid transfer circuit comprises a second pipe extending between a first lower end intended to be connected to a fluid source, an intermediate part situated within the volume delimited by the tower and an upper end projecting at the upper end of the tower (2), the second pipe being able and configured to form a chimney for evacuating vent gases,
  the first pipe is connected to the second pipe via circuitry provided with a set of valve(s),
  the second pipe comprises a plurality of connection ends which are vertically distributed and configured to allow the connection of a removable hose, in particular a flexible hose, forming the second end of the first pipe.

The invention may also relate to any alternative device or method comprising any combination of the features above or below within the scope of the claims.

BRIEF DESCRIPTION OF THE DRAWINGS

The invention will be more readily understood by the perusal of the following description and of the figures. These figures are given only by way of illustration and do not in any way limit the invention.

FIG. 1 represents a schematic and partial side view illustrating an example of a structure and of the use of an installation according to the invention, FIG. 2 represents a schematic and partial side view illustrating another example of a structure of an installation according to the invention in a first configuration, FIG. 3 represents a schematic and partial side view illustrating the installation of [FIG. 2] in a second configuration, FIG. 4 represents a schematic and partial perspective view illustrating a lower detail of the installation with a gangway in a first position, FIG. 5 represents a view analogous to [FIG. 4] with the gangway in a second position, FIG. 6 represents a schematic and partial side view illustrating the tower with the gangway in its first position and in the upper part of the tower, FIG. 7 represents a schematic and partial perspective view from behind, illustrating a lower detail of the installation with the gangway in the second position, FIG. 8 represents a schematic and partial front view of a detail of the fluid transfer circuit in two configurations (two ends respectively non-assembled and assembled).

DETAILED DESCRIPTION OF THE INVENTION

As illustrated in [FIG. 1], the fluid transfer installation 1 is intended for the transfer of fluid (in particular a cryogenic fluid such as liquefied hydrogen) between a source 9, 10 and a receiving unit 16, in particular the reservoir of a boat.

The source comprises, for example, a mobile storage facility 9 for supplying liquefied fluid and/or a fixed or mobile filling station 10.

The installation 1 comprises a tower 2, for example of parallelepipedal general shape, with a beam framework structure, for example a lattice structure. That is to say that the tower 2 may comprise a scaffolding formed by rigid rods or bars, for example metal bars assembled by, preferably demountable, fixing members. The tower 2 may comprise in its interior a ladder system 13 or stairway allowing an operator to climb there (cf. [FIG. 2] or [FIG. 4] for example). One or more intermediate floors 17 may be provided between the lower end and the upper end.

The tower 2 houses part of a fluid transfer circuit 4, 14, 19 which comprises in particular a first pipe 4, 14 extending between a first lower end intended to be connected to the fluid source 10 and a second upper end 14 intended to be connected to the receiving unit 16.

Thus, at least part of the transfer circuit 4, 19 is housed within the volume delimited by the structure of the tower 2.

The tower 2 is composed of at least two preconstructed modules 12, 22 stacked in a separable manner allowing two different configurations of the tower 2 and respectively having different heights.

In a first configuration, the two modules 12, 22 are stacked (assembled), cf. [FIG. 2]. The structures (the frames) of the two modules 12, 22 may be connected to one another by nesting and fastened by bolted or splice plate-type connections, or any other suitable mechanical connection. The assembly may be carried out on the site (quay, for example) where the operation takes place.

The total height may be of the order of 12 m, for example.

In the second configuration, a single module 12 of the modules is used. The height may then be of the order of 5 m to 6 m, for example. Of course, this height is not limiting and could be greater or less (preferably as long as the transport conditions in normal road mode are observed).

The lower module 22 may have a height that is less than the upper module 12 (or vice versa, or an equal height).

The tower 2 may be fastened to the ground by, for example, stud shooting (anchoring in concrete for example). Any other fastening method may of course be envisaged.

As illustrated, this modular structure makes it possible to adapt to different sizes of ships (in particular the height of access to the deck). The tower 2 is thus modular (in the example illustrated, two nestable substructures 12, 22 are provided but more than two modules are conceivable). These modules 12, 22 make it possible to manage access to variable ship heights, for example from zero to more than 15 m. This modularity makes it possible to facilitate standard road transport of the tower 2 by limiting the length excluding accessories.

Thus, to remain compatible with normal road transport (excluding abnormal load width), the modules 12, 22 of the tower 2 preferably have a maximum width of 2.5 m and a maximum height of 3.8 m approximately when the modules are in a recumbent horizontal position. That is to say that the footprint of the tower or of the modules in a vertical position does not exceed 2.5 m×3.8 m.

The transfer circuit 4 situated within the volume delimited by the tower 2 comprises at least two adjacent sections 40 situated respectively at two adjacent ends of the two modules 12, 22.

FIG. 8 schematically illustrates the principle of connecting the two sections 40 of the circuit 4 at the junction between two modules 12, 22 (non-assembled position on the left, assembled position on the right).

These sections 40 are connected to one another via a demountable system, for example with flanges or with collars 34 configured to make it possible to adapt the transfer circuit 4 to the two configurations. The fastening of the flanges 34 preferably occurs without welding (connection by bolted flanges or collar-type flanges, for example by screwing or the like).

The transfer circuit 4 situated within the volume delimited by the tower 2 preferably comprises rigid pipes mounted on the structure of the tower 2 via supports 60, at least some of which can be mounted so as to be adjustable in position relative to the structure of the tower 2. For example, the supports 60 of the rigid pipes 4 are mounted so as to be adjustable in a vertical position relative to the structure of the tower 2 (slidably for example) and/or transversely to the vertical direction of the tower 2. For example, these supports 60 can be adjustable along the three axes in space.

As illustrated, in order to facilitate joining, at least one of the sections of the circuit 4 may comprise a flexible portion 24.

Preferably, the tower 2 further comprises a gangway 6. The gangway 6 is mounted pivotably relative to the tower 2 between a deployed position extending transversely to the tower 2 (cf. [FIG. 5] and [FIG. 7]) and a retracted (raised) position extending along the tower 2 (cf. [FIG. 4] and [FIG. 6]). This pivoting movement of the gangway 6 may be achieved by the fact that a portion of the gangway 6 is mounted on pivots for articulating about a horizontal axis, for example. This pivoting movement makes it possible to compensate for the height variations of boats caused, for example, by the sea level variations associated with tidal phenomena.

Furthermore, the gangway 6 is preferably mounted in a vertically slidable manner on the tower 2 (cf. the upper position in [FIG. 6] and lower position [FIG. 4]).

The gangway 6 thus allows access to the deck of a ship 16 whatever the height (for example up to 15 m or more). This vertically positionable gangway 6 is also retractable (raisable) in order to be able to be disengaged from the ship. The sliding movement of the gangway 6 over all or part of the height of the tower 2 makes it possible to adapt to the altitude of the access deck of the ship 16.

As schematically illustrated particularly in [FIG. 5], the gangway 6 is, for example, mounted slidably on the tower 2 via a system of rails 7 (or slideways). The sliding mechanism may be actuated manually or electrically, for example. This structure makes it possible to adapt and configure rapidly to access deck heights which can be variable between different types of boats 16 to be supplied.

As schematically illustrated in [FIG. 1], the second end of the first pipe 4 of the transfer circuit may comprise a flexible transfer hose 14 which extends towards the outside of the tower 2 in order to be connected to the reservoir 16 to be filled. The terminal end of the flexible hose 14 can be provided with a quick connector having self-closing valve(s). The other end of the flexible hose 14 is preferably connected in a demountable manner to the (rigid) central part of the first pipe 4. The tower 2 preferably has a support bracket 8 for supporting said flexible transfer hose. The bracket 8 extends transversely to the tower 2.

The bracket 8 for holding the flexible transfer hose 14 makes it possible to adapt to the height of the access deck, which may be different depending on the ships, and according to the tidal height, where appropriate. The flexible transfer hose 14 is preferably adjustable in position. For example, the flexible hose 14 can slide vertically by means of a slideway (or rail) positioned on the structure of the tower 2 (laterally or frontally, for example). The sliding mechanism may be actuated manually or electrically. Thus, just like the gangway 6, the bracket 8 may be vertically slidable to adapt and configure rapidly to access deck heights which can be variable between different types of boat to be supplied.

The bracket 8 is preferably articulated about a vertical axis allowing it to be folded onto the flank of the structure of the tower 2 (in order to disengage from the ship, for example, and/or for transport of the tower 2). A fastening system may be provided to keep the bracket in the chosen position.

In [FIG. 4] and [FIG. 5], the bracket 8 is represented schematically. It comprises, for example, a first arm which extends vertically along the tower 2 and an upper end of which is connected to a second arm which extends transversely with respect to the tower 2. The bracket 8 is, for example, articulated on a hinge about a vertical axis via a structure connected to one side of the tower 2. The bracket 8 is in a position facing laterally towards the side in [FIG. 4] and [FIG. 5].

As can be seen in [FIG. 1], the transfer circuit comprises a second pipe 19 forming a chimney 19 for evacuating vent gases. This chimney 19 comprises a lower end which can be connected to the fluid source 10, for example to the fluid delivery station. The chimney 19 comprises an upper end preferably projecting at the upper end of the tower 2 to release the pressurized gas.

It should be noted that the principle of connecting in sections that is illustrated in [FIG. 8] can also be applied to this second pipe 19.

As can be seen in [FIG. 6] and [FIG. 7], this second pipe 19 situated within the tower may comprise a plurality of connection ends 41 which are vertically distributed and configured to allow the connection of an end of the flexible transfer hose 14. This makes it possible to position the second end 41 of the transfer circuit at different altitudes. When they are not connected to the flexible transfer hose 14, these connection ends 41 are closed in a sealed manner by demountable flanges, for example.

These connection ends 41 may be tapping points for an end of the flexible transfer hose 14, for example at each stage of the tower 2. This allows the connection of the flexible transfer hose 14 during the standby phases (no ships to be supplied) between two liquid transfer phases.

This or these tapping points 41 may be used in order to ensure completely safe evacuation of the gaseous hydrogen which may be contained in the circuit. These ends 41 may also serve to mechanically protect the end of the flexible transfer hose 14 in order not to damage its mechanism and its meeting plane.

These connection ends 41 also make it possible to ensure a heating function in order in particular to have an end flange close to the ambient temperature so as to avoid trapping moisture at the moment of connecting with the interface of the reservoir 16 to be filled and thus avoid possibly blocking the mechanism of this end flange (icing).

This makes it possible to avoid polluting the fluid (for example the liquid hydrogen) contained in the storage facility of the boat 16.

These multiple connection points 41 at different levels or stages make it possible to prevent an operator from having to manage the handling of the flexible transfer hose 14 from one level of the tower 2 to the other (via stairways 13). Specifically, in the case of a single connection point 41, the operator would be forced to raise or lower the terminal end of the flexible transfer hose 14 within the tower 2 in order to adapt to different heights while maintaining the connection point 41 at a different altitude. The proposed architecture optimizes ergonomics, safety and also the operating time.

As schematically illustrated in [FIG. 1], the lower end of the first liquid transfer pipe 4 may be connected to the lower end of the second pipe 19 (gas evacuation chimney), for example at the source station 10, via circuitry 15 provided with a set of valve(s). Thus, the evacuation of gas in the transfer circuit may be achieved via this circuitry (the gas circulating downwards in the first pipe 4 of the transfer circuit and then joining the lower end of the second pipe 19 (chimney) via the circuitry 15 in order then to be evacuated to the atmosphere at the top.

Thus, the first pipe 4, 14 of the circuit allows the transfer of liquid between the fluid source 9, 10 and the boat 16, while the second pipe 19 can be used for the evacuation of gas via an upper chimney for all the vent gases emanating from the circuit (vent gas of the first pipe 4, 14 and/or of the circuitry 15 and/or of the source 9, 10).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An installation for transferring fluid between a fluid source and a receiving unit, the installation comprising:
    a tower with a beam framework structure, the tower comprising a fluid transfer circuit comprising at least one pipe provided with a first pipe extending between a first lower end configured to be connected to the fluid source and a second upper end intended to be connected to the receiving unit, at least part of the transfer circuit situated between the first and second ends being housed within the volume delimited by the tower,
    wherein the tower is composed of at least two separable stacked modules allowing two different configurations of the tower respectively having different heights: a first configuration with the two stacked modules, and a second configuration with a single module, and
    wherein the transfer circuit situated within the volume delimited by the tower comprises two sections situated respectively in the two modules, the two sections being connected to one another via a system of demountable connectors configured to make it possible to adapt the height of the transfer circuit to the two configurations.

2. The installation according to claim 1, wherein, in a recumbent horizontal position, each of the modules has a width less than or equal to 2.5 m and a height less than or equal to 3.8 m.

3. The installation according to claim 1, wherein the lower module has, in the vertical position, a height less than or equal to the upper module.

4. The installation according to claim 1, wherein the transfer circuit situated within the volume delimited by the tower comprises pipes mounted on the structure of the tower via supports.

5. The installation according to claim 4, wherein at least some of the supports are mounted so as to be adjustable in position relative to the structure of the tower.

6. The installation according to claim 5, wherein at least some of the supports of the rigid pipes mounted so as to be adjustable in a vertical position relative to the structure of the tower and/or transversely to the vertical direction of the tower.

7. The installation according to claim 1, wherein the transfer circuit situated within the volume delimited by the tower comprises at least one flexible pipe portion.

8. The installation according to claim 1, wherein the tower comprises a gangway mounted pivotably relative to the tower between a deployed position extending transversely to the tower and a retracted position extending along the tower, the gangway being mounted in a vertically slidable manner on the tower.

9. The installation according to claim 1, wherein the second end of the transfer circuit comprises a flexible hose, the tower comprising a support bracket for supporting said flexible hose.

10. The installation according to claim 9, wherein the bracket is mounted in a vertically slidable manner on the tower and/or is articulated on the tower about a vertical axis.

11. The installation according to claim 1, wherein the fluid transfer circuit comprises a second pipe extending between the first lower end intended to be connected to the fluid source, an intermediate part situated within the volume delimited by the tower and an upper end projecting at the upper end of the tower, the second pipe being able and configured to form a chimney for evacuating vent gases.

12. The installation according to claim 11, wherein the first pipe is connected to the second pipe (19) via circuitry provided with at least one valve.

13. The installation according to claim 11, wherein the second pipe comprises a plurality of connection ends which are vertically distributed and configured to allow the connection of a removable hose, thereby forming the second end of the first pipe.

* * * * *